Dec. 12, 1933.  H. A. MINER  1,938,715
FRICTION SHOCK ABSORBING MECHANISM
Filed Sept. 28, 1931
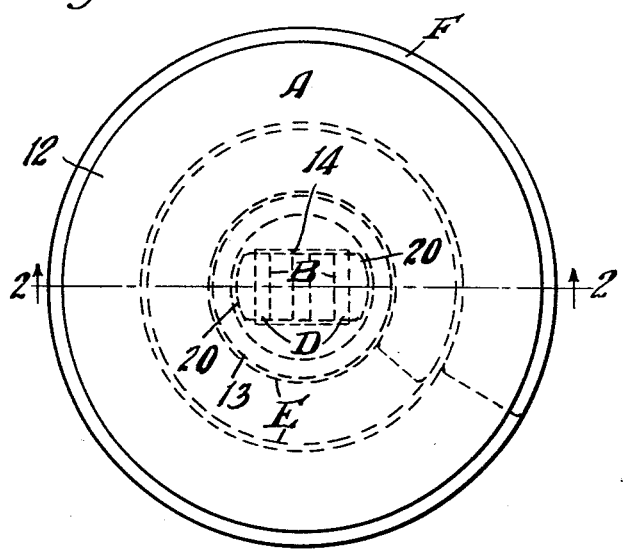
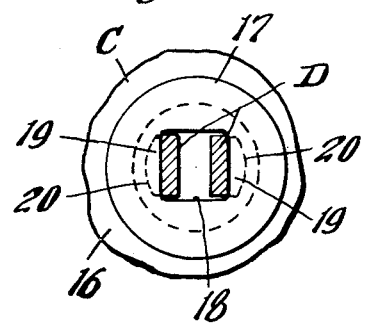
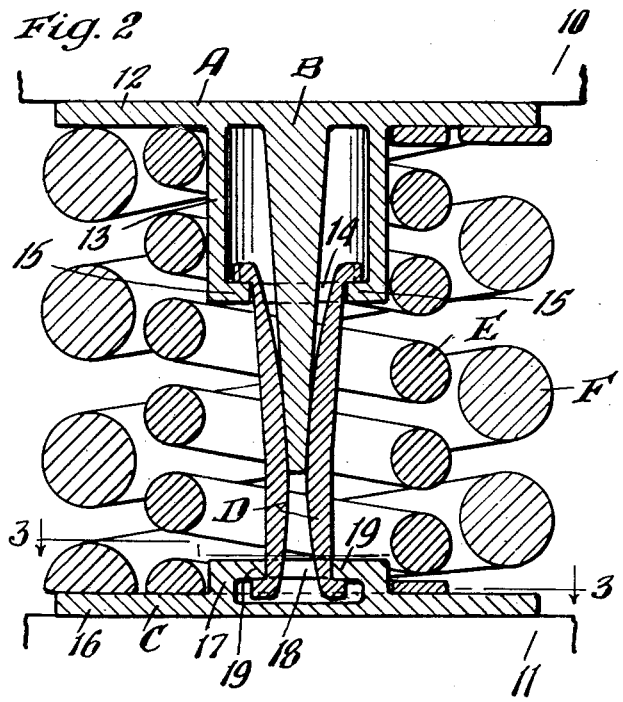
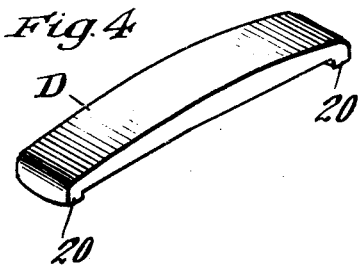
Inventor
Henry A. Miner
Witness
Wm. Geiger
By Henry Fuchs Atty.

Patented Dec. 12, 1933

1,938,715

UNITED STATES PATENT OFFICE 1,938,715

FRICTION SHOCK ABSORBING MECHANISM

Henry A. Miner, Evanston, Ill., assignor to W. H. Miner, Inc., Chicago, Ill., a corporation of Delaware Application September 28, 1931
Serial No. 565,559

4 Claims. (Cl. 267—9)

This invention relates to improvements in friction shock absorbing mechanisms.

One object of the invention is to provide a friction shock absorbing mechanism in the form of a simple, efficient, compact unit, which may be employed as cushioning means for car trucks, railway draft riggings, and other similar devices.

A more specific object of the invention is to provide a friction shock absorbing unit including a pair of relatively movable spring follower elements, spring resistance elements, and combined friction and spring means opposing relative approach of said follower elements, wherein the combined means includes a pair of spring plates held against movement with respect to one of said spring followers, and wedge means movable with the other spring follower for wedging said spring plates apart, the wedge means having sliding frictional contact with said plates to augment the resistance offered by the unit, and wherein the first named spring resistance elements act to return the parts to normal position.

Other objects of the invention will more clearly appear from the description and claims hereinafter following.

In the drawing, forming a part of this specification, Figure 1 is a top plan view of my improved friction unit. Figure 2 is a transverse, vertical sectional view, corresponding substantially to the line 2—2 of Figure 1 and also showing a pair of follower-acting members cooperating with the unit. Figure 3 is a transverse, horizontal sectional view, corresponding to the line 3—3 of Figure 2, said view being partly broken away. And Figure 4 is a detail perspective view of a spring plate member employed in connection with my improved construction.

In said drawing 10 and 11 indicate two end follower-acting members between which my unit is disposed. The end follower-acting members 10 and 11 may be either the end followers of a railway draft rigging or abutment means of the truck and body bolsters of a railway car, between which the cushioning means for the truck is ordinarily disposed, the same commonly being in the form of nested coil springs.

My improved friction shock absorbing unit comprises broadly a spring follower A having a projecting wedge post B; a second spring follower C; a pair of spring plates D—D; and two coil springs E and F.

The spring follower A has a disclike section 12, which bears directly on the follower 10. Centrally of the disclike section 12, the spring follower A carries the wedge post B, which projects inwardly therefrom, as clearly shown in Figure 2. A hollow boss 13 surrounds the inner end portion of the post and has an elongated opening 14 in the outer end wall thereof through which the post projects. As shown in Figures 1 and 2, the opening 14 is of such a size that the end walls thereof are spaced from the corresponding sides of the post. Retaining shoulders 15—15 are thus provided at the opposite ends of the opening 14, which cooperate with the spring plates D—D in a manner hereinafter pointed out. The post B, as shown, is tapered outwardly and engages between the spring plates D—D.

The spring follower C also comprises a disclike section 16, which bears directly on the main follower 11. At the center, the disclike section of the spring follower C is provided with a hollow boss 17 having the outer end wall thereof provided with a transverse opening 18 adapted to receive the corresponding ends of the spring plates D—D. At the opposite ends of the opening 18, the outer wall of the boss provides retaining shoulders 19—19, which cooperate with the plates D—D.

The spring plates D—D are arranged lengthwise of the unit and are spaced apart laterally, as clearly shown in Figure 2. The two plates are of similar design, each being curved lengthwise and thickened between its ends, as shown in Figures 2 and 4. The plates are so arranged that the convex surfaces thereof are innermost and opposed to each other. At opposite ends, each plate D is provided with laterally projecting retaining lugs or ribs 20—20. The ribs 20—20 at the upper ends of the plates D—D have shouldered engagement with the shoulders 15—15 of the boss 13 of the follower A. The ribs 20—20 at the lower ends of the plates D—D have shouldered engagement with the shoulders 19—19 of the hollow boss 17 of the spring follower C.

The spring resistance elements E and F surround the plates D—D and the hollow bosses 13 and 17 of the spring followers A and C. The spring E, as shown, is lighter than the spring F, and both springs have their opposite ends bearing directly on the disclike sections of the spring followers A and C.

When the unit is assembled, the lugs or ribs 20—20 on the plates D—D act as retaining means for holding the entire unit assembled and holding the springs E and F under a predetermined initial compression. The normal position of the parts of the unit is that shown in Figure 2. In absorbing or cushioning a shock, the spring followers A and C will be moved relatively toward each other due to relative approach of the main followers 10 and 11. During the approach of the spring followers A and C, the two coil springs E and F will be compressed, and the wedge post B will be advanced toward the follower C, thereby wedging the spring plates D—D apart. Inasmuch as the bottom ends of the plates D—D engage the follower C, these plates will remain stationary with respect to this follower, and the wedge post B will slide on the inner convex surfaces of the plates, thereby creating a certain amount of friction between the cooperating surfaces of the plates and the wedge post B. The resistance offered by the springs E and F is augmented due to the resistance offered by flexing of the spring plates D—D through the wedging action of the post B. Additional resistance is also provided by the sliding frictional contact between the post B and the plates D—D. Relative approach of the spring followers A and C will be limited by engagement of the outer end of the post B with the follower C, the post thus acting as a column member to transmit the load from one spring follower to the other and prevent undue compression of the springs E and F.

In release, when the actuating force has been reduced, the expansive action of the springs E and F will force the spring followers A and C apart. Inasmuch as the spring plates D—D are anchored to the hollow boss 17 of the spring follower C, the plates will be held against upward movement during separation of the spring followers. Outward movement of the spring followers A and C with respect to each other is finally limited by engagement of the shoulders 15—15 of the boss 13 of the follower A with the corresponding lugs or ribs 20—20 of the plates D—D.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a pair of follower-acting elements movable toward and away from each other; of a pair of longitudinally disposed spring plates anchored at one set of ends to one of said follower elements; a wedge fixed to the other follower element and engageable between said plates to wedge them apart; guide means on said last named follower element slidingly supporting said plates; cooperating shoulders on said plates and guide means for limiting relative separation of said follower element and plates; and a spring surrounding said spring plates and interposed between said follower elements.

2. In a friction shock absorbing mechanism, the combination with a follower element; of a pair of longitudinally disposed spring plates anchored to said follower element; a second follower element, said follower elements being movable toward and away from each other, said plates being movable toward and away from said second named follower element; cooperating stop means on said plates and second named follower element for limiting relative separation of said follower element and plates to less than the maximum relative movement of said follower elements; and a wedge fixed to the second named follower element and engageable between said plates to wedge them apart and flex the same during relative approach of said follower elements.

3. In a friction shock absorber, the combination with a pair of follower-acting elements movable toward and away from each other; of a pair of opposed, inwardly bowed, longitudinally disposed spring plates movable with one of said follower elements, said plates having the convex sides thereof adjacent to each other and being supported against lateral outward movement at opposite ends and being unsupported between said ends; and a wedge movable with the other follower element, engageable between and in direct frictional contact with said plates to wedge the same apart during the entire relative approaching movement of said follower elements to flex said plates.

4. In a friction shock absorber, the combination with a pair of followers movable toward and away from each other; of a pair of opposed, inwardly bowed spring plates, said plates tapering toward opposite ends and being anchored to one of said followers; a wedge having outwardly converging wedge faces, said wedge being movable with the other follower, engaging between said plates and having the converging faces thereof at all times in contact with said plates to thereby flex said plates upon relative approach of said followers; and additional spring resistance means interposed between said followers and opposing relative approach thereof.

HENRY A. MINER.